March 29, 1966 G. KITTLAUS ETAL 3,243,364
APPARATUS FOR TREATING WASTE GASES IN ALUMINUM CELLS
Filed July 24, 1961 4 Sheets-Sheet 1

INVENTORS:
GEORG KITTLAUS
HEINZ PETERS
PAUL SCHÄFER
GÜNTHER WENDT
HANS LAY
FRANZ ANHUTH
GÜNTHER LANGE
BY

ATTORNEY

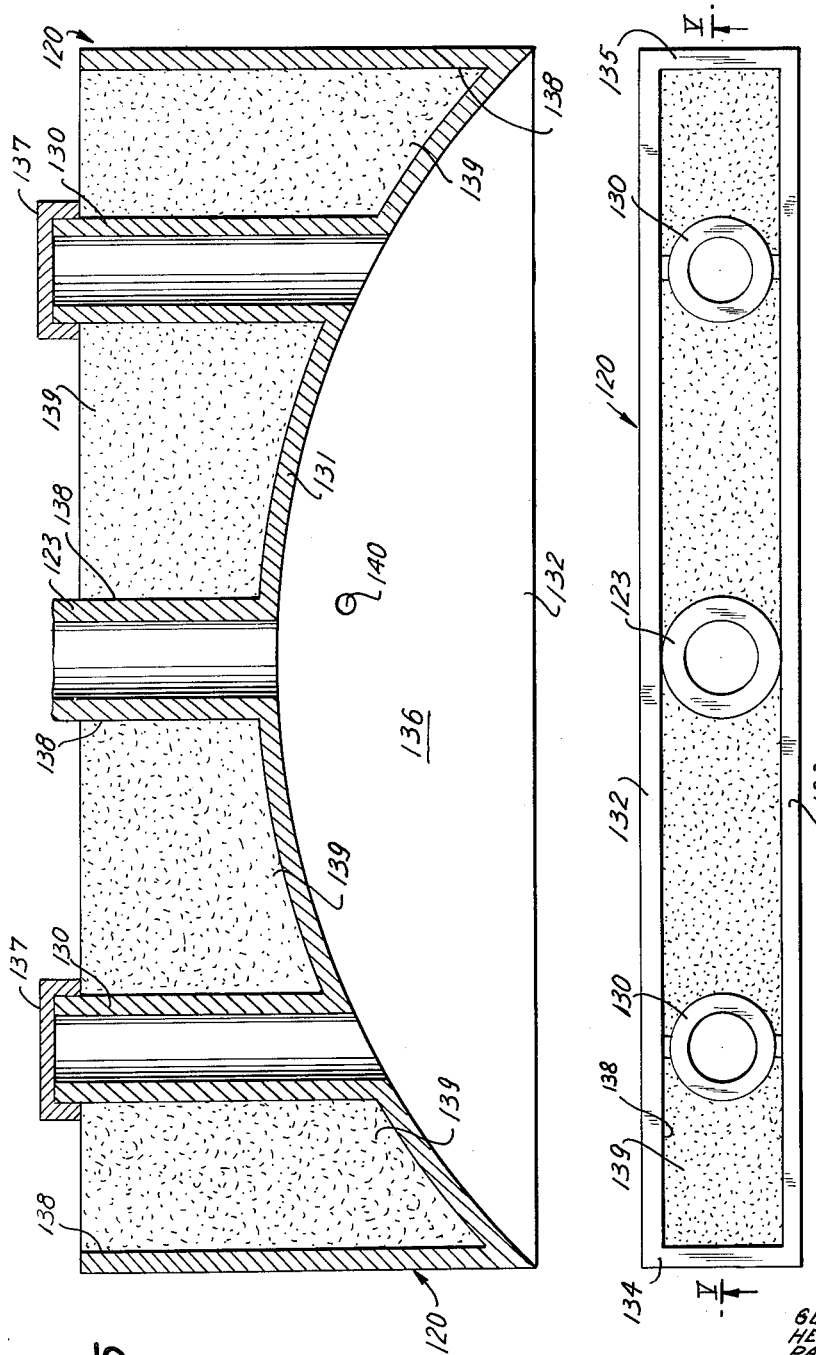

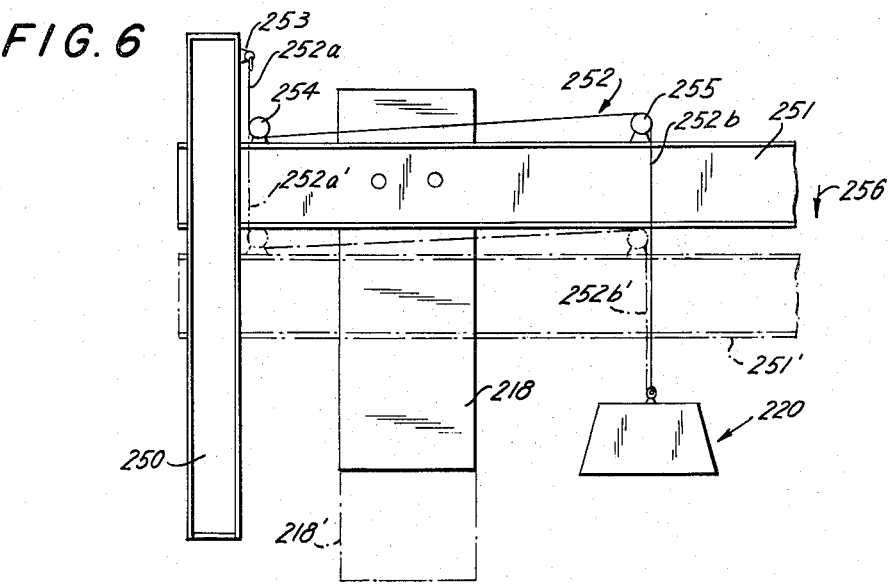

3,243,364
APPARATUS FOR TREATING WASTE GASES IN ALUMINUM CELLS
Georg Kittlaus, Heinz Peters, Paul Schaefer, and Guenther Wendt, Toeging (Inn), and Hans Lay, Franz Anhuth, and Guenther Lange, Grevenbroich, Lower Rhine, Germany, assignors to Vereinigte Aluminum-Werke Aktiengesellschaft, Bonn, Germany
Filed July 24, 1961, Ser. No. 126,065
Claims priority, application Germany, July 27, 1960, V 19,064
5 Claims. (Cl. 204—247)

The present invention relates to a process and to an apparatus for treating waste gases, also called anode gases, which develop in aluminum producing electrolytic cells, and more particularly to a process and apparatus for collecting, combusting, filtering and scrubbing such waste gases. Still more particularly, the invention relates to a process and apparatus for the treatment of waste gases in electrolytic cells which utilize prebaked carbon electrodes.

As is known, bubbles of carbon monoxide and carbon dioxide gas are given off at the anodes when the aluminum producing electrolytic cell is in operation. These gases, together with comparatively small quantities of certain other gases and solid ingredients, such as alumina dust, soot and fluoride, constitute the so-called anode gas, hereinafter called waste gas. Certain ingredients of such waste gases (e.g., carbon monoxide) are harmful, and certain other ingredients (particularly fluorine) are sufficiently valuable to warrant their separation from the gaseous product.

Accordingly, it is an important object of the present invention to provide a process and an apparatus for continuously and economically treating waste gases developing in the production of aluminum by the electrolytic process so that all harmful ingredients of the gases are neutralized and that the valuable ingredients of the gases may be recovered in a very simple way.

Another object of the invention is to provide a process and apparatus of the just outlined characteristics which render it possible to collect waste gases in a highly concentrated state so that the dimensions of the gas filtering, scrubbing and other instrumentalities may be very small which results in lower initial and maintenance costs of such apparatus.

A further object of the invention is to provide an apparatus of the above described type which is constructed and assembled in such a way that carbon monoxide contained in waste gases is automatically reacted with oxygen even before the gases leave the cell, and that the heat energy developing during reaction of carbon monoxide gas with oxygen may be utilized in the cell to prevent undesired hardening of molten electrolyte.

An additional object of our invention is to provide an apparatus of the above outlined characteristics which is constructed and assembled in such a way as to protect the exposed surfaces of carbon anodes from undesired oxidation, and which is useful not only in electrolytic cells of the type wherein the carbon anodes are adjustable individually but also in cells wherein the anodes are simultaneously adjustable with respect to the molten electrolyte layer.

A concomitant object of the instant invention is to provide an apparatus of the above described type which may simultaneously serve as a means for preheating and for admitting controlled quantities of alumina to the cell, and which may be utilized with equal advantage in very large as well as in comparatively small electrolytic cells.

Still another object of the invention is to provide an apparatus for treating waste gases developing in the production of aluminum in electrolytic cells which is constructed and assembled in such a way that waste gases are fully insulated from the surrounding atmospheric air or that only such quantities of atmospheric air are permitted to mix with waste gases as are necessary for complete combustion of certain components of the gaseous product.

A further object of our invention is to provide an apparatus of the above outlined characteristics which requires only small changes in the customary shape and construction of electrolytic cells, and which may be conveniently installed in existing cells without necessitating major alterations in their construction.

With the above objects in view, the invention resides in the provision of a process for withdrawing waste gases given off at the anodes dipping into the molten electrolyte layer which is disposed beneath and is spaced from a frozen crust of electrolyte in the aluminum producing electrolytic cells, the process comprising the steps of forming in the frozen crust of electrolyte a path for the passage of waste gases between a pair of adjacent anodes, placing a gas collecting member into the path of gases so that the gases accumulated in the space between the molten electrolyte layer and the frozen crust of electrolyte are compelled to stream into the gas collecting member, and withdrawing waste gases from the gas collecting member. In accordance with an important feature of our process, the combustible ingredients of waste gases are preferably reacted with oxygen within the gas collecting member so that heat developing when the hot waste gases are automatically combusted on contact with oxygen prevents hardening of the molten electrolyte layer beneath the gas collecting member. Since the waste gases contain certain solid ingredients, such as soot, alumina, etc., these solid ingredients are preferably separated from waste gases before the latter are subjected to a scrubbing action with a view to recover certain valuable ingredients, particularly fluorine.

The electrolytic cell embodying the apparatus of our invention comprises a container for a layer of molten electrolyte and for a crust of frozen electrolyte which is located above and defines a space with the molten electrolyte layer, a plurality of adjacent carbon electrodes which extend through the frozen crust and dip into the molten electrolyte layer so that waste gases are given off at the anodes to accumulate in the space between the frozen crust and the electrolyte layer when the cell is in operation, and an arrangement for removing waste gases from the aforementioned space, this arrangement comprising at least one hollow gas collecting member extending through the frozen crust and having an open lower end which communicates with the space so that waste gases may stream into the interior of the gas collecting member, and conduit means connected with the gas collecting member for withdrawing waste gases therefrom.

Certain other features of the improved arrangement reside in the provision of a specially constructed and configurated gas collecting member which is formed with one or more ducts to permit continuous or intermittent introduction of alumina into the molten electrolyte layer, in the provision of a specially constructed separator which is associated with the conduit means for withdrawing waste gases from the gas collecting member, in the provision of heat insulating packing in and/or about the gas collecting member, and in the provision of a mechanism which adjusts the anodes with respect to the molten electrolyte layer while maintaining the gas collecting member at a predetermined distance from the electrolyte layer.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 4 is a top plan view of a different gas collecting member;

FIG. 5 is a longitudinal central section as seen in the direction of arrows from the line V—V of FIG. 4;

FIG. 6 is a schematic side elevational view of a mechanism for moving the anodes toward the molten electrolyte layer and for supporting a gas collecting member in a fixed position with respect to the electrolyte layer;

FIG. 7 is a longitudinal central section through a gas collecting member and through a device which separates solid particles from the waste gases, the section of FIG. 7 being taken in the direction of arrows from the line VII—VII of FIG. 8; and FIG. 8 is a section as seen in the direction of arrows from the line VIII—VIII of FIG. 7.

Figure 1:
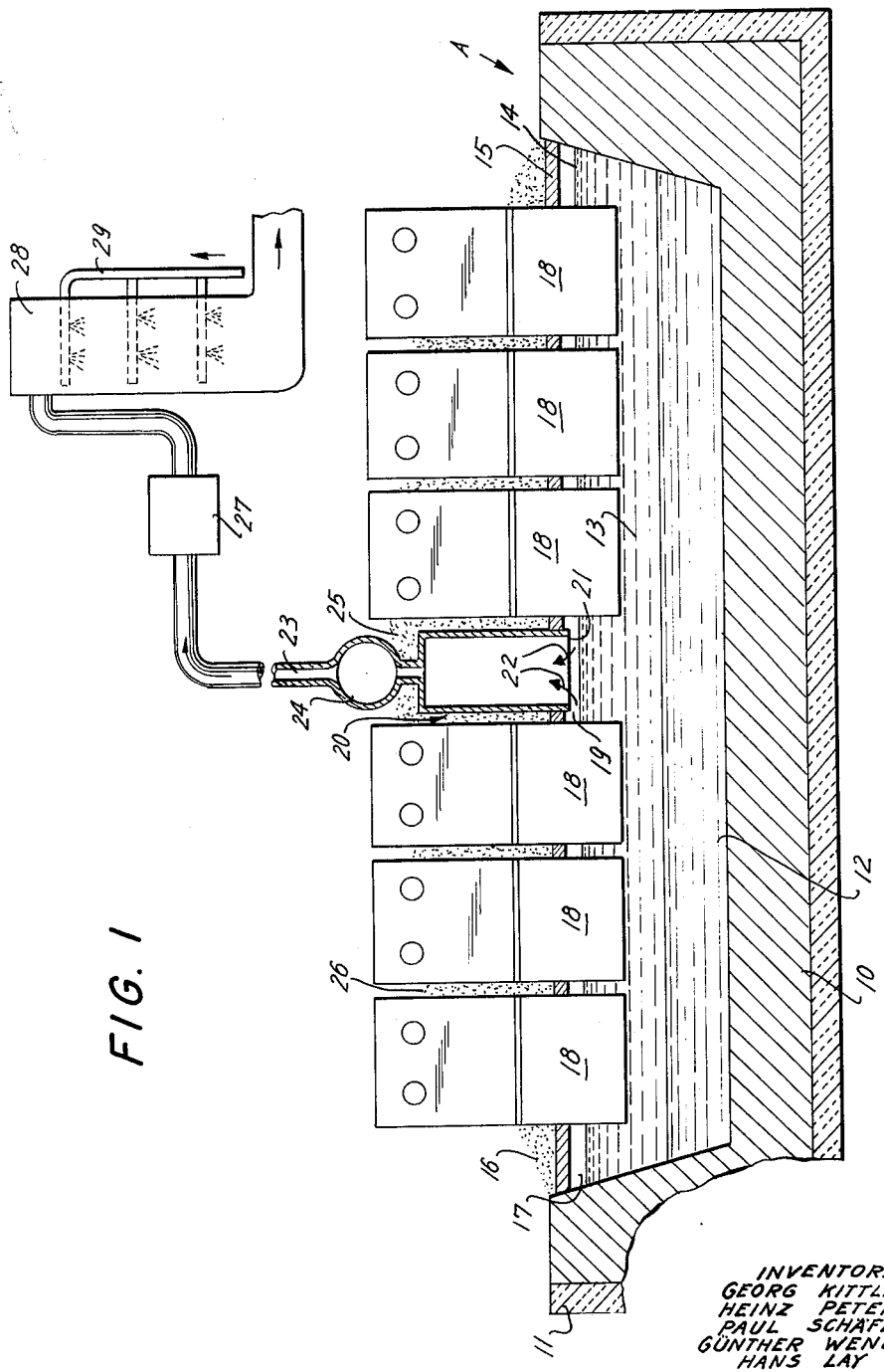
FIG. 1 is a partly elevational and partly sectional view of an electrolytic cell which is provided with a waste gas collecting and treating arrangement embodying one form of the invention.
Figure 2:
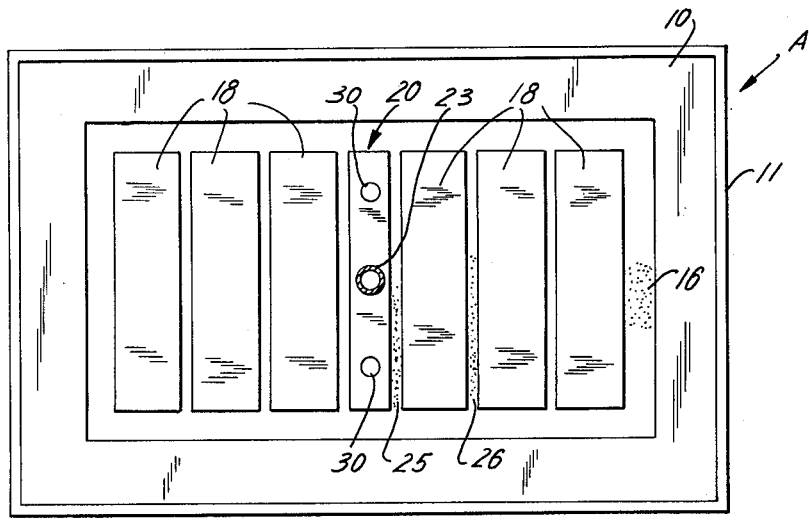
FIG. 2 is a schematic top plan view of the cell with certain parts broken away.

Referring now in greater detail to the illustrated embodiments, and first to FIGS. 1 and 2, there is shown an electrolytic cell A which comprises a carbon clad container 10 surrounded by the customary thermal insulation 11. The container 10 forms a trough for a lower liquid layer 12 consisting of molten aluminum and for an upper liquid layer 13 consisting of molten electrolyte, i.e., alumina dissolved in cryolite. The upper level of the molten electrolyte layer 13 is indicated by the reference numeral 14; this level is located beneath the frozen crust 15 of electrolyte which is covered by a packing 16 consisting of alumina, cryolite, sodium carbonate or a mixture of these substances. The space 17 between the upper level 14 of the molten electrolyte layer 13 and the underside of the frozen crust 15 is filled with waste gases which are given off at the elongated rectangular anodes 18 and which mainly consist of carbon monoxide and carbon dioxide containing pulverulent alumina, soot, fluoride, etc., as is well known in the art. These waste gases stream to the central zone 19 of the space 17 between the spaced median anodes 18 and are withdrawn through a centrally located hood shaped hollow gas collecting member 20. The lower ends of the anodes 18 dip into the molten electrolyte layer 13. As best shown in FIG. 2, the member 20 (hereinafter called hood) is of elongated rectangular shape and is provided between the two central anodes 18. Its open lower end 21 extends below the underside of the crust 15 so as to permit the entry of waste gases (arrows 22) from the central zone 19 of the space 17, and the upper wall of the hood is connected with gas withdrawing conduit means in the form of a centrally located tubular extension 23 including a hollow cylindrical separator 24 which latter serves as or comprises means for removing solid ingredients from the ascending waste gases. As shown in FIG. 1, the exposed exterior of the hood 20 is insulated with a packing 25 of alumina, cryolite, sodium carbonate or a mixture of these substances. This packing preferably consists of alumina and prevents oxidation of the adjacent anode surfaces. Additional packing material 26 is compacted in the channels or gaps between each pair of adjacent anodes, and such additional packings may extend from the crust 15 toward the upper ends of the anodes to prevent undesirable oxidation of anode surfaces and resultant loss of anode material.

It has been found that the separator 24 removes a major percentage of pulverulent material from waste gases ascending through the conduit 23. The gases which are now almost free of solid impurities are conveyed to a burner 27 and thence to one or more scrubbing apparatus 28 where they are subjected to the action of sprays of an atomized reagent, e.g., liquid sodium carbonate or a mixture of sodium carbonate and sodium bicarbonate which is admitted through a system of pipes 29 so as to absorb all traces of hydrofluoric acid from the combustion products leaving the burner 27. The conduit 23 may contain a blower which draws waste gases toward the scrubbing apparatus 28.

The hood 20 and the insulating packing 25 prevent molten electrolyte from forming a frozen crust beneath the central zone 19 of the space 17 so that the withdrawal of waste gases can take place without any interruption and that waste gases ascending through the conduit 23 are highly concentrated.

FIG. 2 shows that the conduit 23 is preferably connected with the central portion of the hood 20 (the separator 24 has been omitted for the sake of clarity), and the hood preferably comprises one or more sealable inlet ducts 30 which serve as means for permitting periodic or continuous introduction of alumina into the molten electrolyte layer 13.

Figure 3:
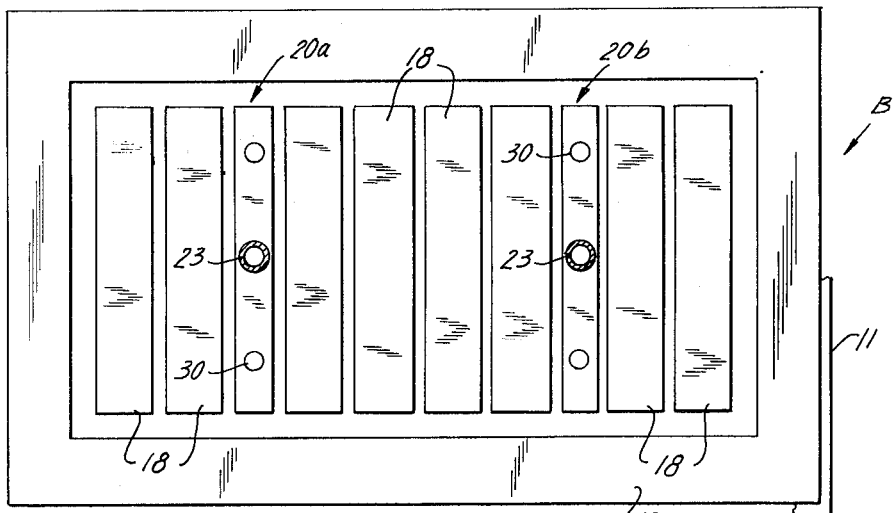
FIG. 3 is a schematic top plan view of a modified electrolytic cell whose waste gas collecting arrangement comprises two hood like gas collecting members.

FIG. 3 illustrates a modified electrolytic cell B which differs from the cell A in that it comprises two hoods 20a, 20b whose construction is identical with that of the hood 20 shown in FIGS. 1 and 2. The somewhat larger container 10a accommodates eight carbon anodes 18 and the hoods 20a, 20b are respectively located between the second and third and between the sixth and seventh anodes.

FIGS. 4 and 5 illustrate a modified hood 120 which has a concave or dome shaped bottom wall 131 bounded by two elongated side walls 132, 133 and two end walls 134, 135 so that the walls 131, 132, 133 define between themselves a chamber 136 which receives waste gases from the space 17 (see FIG. 1) and which communicates with a centrally located upwardly extending conduit 123 corresponding to the conduits 23 shown in FIGS. 1 to 3. The tubular ducts 130 which are disposed at the opposite sides of the conduit 123 and which also communicate with the chamber 136 serve as means for periodically or continuously admitting alumina to the molten electrolyte layer in the cell in which the hood 120 is put to use. The upper ends of the ducts 130 may be sealed by suitable covers or caps 137. The material admitted through the ducts 130 is at least partially heated on its way toward the electrolyte layer.

The upper side of the bottom wall 131 defines with the walls 132–135 and with the parts 123, 130 four pocket like compartments 138 which are filled with a packing of insulating material 139, e.g., alumina, cryolite or sodium carbonate.

The side walls 132, 133 of the hood 120 may be formed with one or more air- or oxygen-admitting apertures 140 so that the waste gases may be reacted with oxygen and will burn in the chamber 136. The temperature of waste gases in the chamber 136 is in the range of about 650–750° C. so that these gases are hot enough to be ignited automatically as soon as they are mixed with oxygen admitted through the aperture 140. Thus, the burner 27 of FIG. 1 may be omitted if the waste gases are ignited before leaving the hood. Such mode of operation is of considerable advantage because of the burning gases prevent molten electrolyte from forming a crust beneath the chamber 136 such as would prevent the entry of gases into the hood.

For example, a hood 20, 20a, 20b, 120 may have a length of between 120–190 cm., a width of between 30–40 cm., and a height of between 35–75 cm. It normally consists of cast iron and, since it is preferably installed between a pair of adjacent carbon anodes 18, it may be insulated in an extremely simple way, e.g., as shown in FIG. 1. Thus, its side walls may be insulated by packing stamped aluminum into the transversely extending channels or gaps between the side walls and the adjacent anodes, and its upper side may be insulated against heat radiation by an additional layer of alumina or another of the aforementioned packing substances.

The diameter of the aperture 140 may be in the range of about 10 mm.

The hood of our invention is capable of collecting waste gases in a highly concentrated state containing between 95–99 percent of a mixture of carbon monoxide and carbon dioxide. The waste gases withdrawn through the hood or hoods constitute between 80–95 percent of all waste gases developing in the cell. Since the concentration is very high, the quantity of gases is comparatively small, e.g., in a cell carrying 80,000 amperes the production of waste gases is between 18–20 Nm.$^3$/h. The waste gases normally contain between 30–35 percent carbon monoxide gas which explains the advisability of providing a burner prior to the scrubbing operation. When the combustion takes place in the hood proper, the aperture or apertures 140 (FIG. 5) will admit 4–5 units per volume of air for each unit per volume of waste gas to insure full combustion of combustible ingredients. Thus, and again assuming that the cell carries 80,000 amperes, the carbon monoxide gas is completely reacted with oxygen if the quantity of air admitted to the chamber 136 of the hood 120 shown in FIGS. 4 and 5 is such that the conduit 123 will convey between 80–100 Nm.$^3$/h. of gas which is much less than in conventional waste gas collecting systems of which we are aware at this time. Consequently, the hood or hoods may be associated with a much smaller and hence cheaper filtering and scrubbing apparatus. The waste gases discharged from the hood or hoods of our invention are preferably subjected to the following treatments:

(a) mechanical separation of coarser solid impurities as by means of cyclones or settling chambers such as the separator 24 shown in FIG. 1;

(b) electrostatic separation of fine impurities by means of electrofilters (electronic filters); and (c) intensive scrubbing with water or another liquid substance.

The sequence of these treatments varies in dependency on the nature and composition of gases, on the temperature of gases and/or on the nature of impurities contained therein.

An important advantage of alumina admitting ducts 30, 130 is that the material is heated on its way toward the electrolyte layer and that the material may be admitted continuously which eliminates the so-called, "Anode effect," with resultant savings in energy, anode material, electrolyte and man hours.

In FIGS. 1 to 3, the carbon anodes 18 are assumed to be of the fixed type, i.e., they are mounted on fixed aluminum or copper bus bars (not shown) and may be adjusted individually. However, when the anodes are rigidly fixed to vertically adjustable bus bars, the hood is mounted in a manner as shown in FIG. 6. The non-illustrated cell comprises a mechanism including one or more upright members 250 and one or more horizontal members or bus bars 251 which serve as a means for moving the carbon anodes 218 (only one shown) toward the molten electrolyte. The hood 220 is suspended from one end of a cable 252 whose other end is secured to an eye 253 fixed to the upright member 250 and which is led about pulleys 254, 255 mounted on the bus bar 251. When the bus bar 251 is caused to descend in the direction of the arrow 256 to assume the phantom-line position 251', the anode 218 also descends to the phantom-line position 218' but the hood 220 retains its position with respect to the molten electrolyte layer because the overall length of the cable 252 remains unchanged, i.e., the combined length of cable portions 252a, 252b or 252a', 252b' is always the same because the distance between the pulleys 254, 255 is constant. Thus, the suspension of the hood 220 is such that it is always slightly spaced from the molten electrolyte layer and that waste gases filling the space between the frozen crust and the electrolyte layer may always enter the internal chamber of the hood.

Referring to FIGS. 7 and 8, there is shown a hood 320 of the type shown in FIGS. 1 and 2 but without ducts 30. These illustrations show in greater details one form of a separator 324 which remove coarser impurities from waste gases ascending from the hood 320 through the tubular member 323. The lower portion 323a of the tubular member 323 is staggered or laterally offset with respect to the upper portion 323b so that the waste gases must pass through a substantially horizontal internal compartment 360 of the hollow cylindrical separator 324. The latter extends in the longitudinal direction of the elongated rectangular hood 320 so that the coarser impurities advancing with the gases in the direction indicated by the arrow 361 are caused to rebound on the walls of the separator and are slowed down to such an extent that they remain in the separator. Such impurities may be removed by means of a suitable tool or the like which is insertable into the chamber 360 upon removal of a wall portion or door 362 which is provided with a handle and forms part of the separator 324. It is desirable to prevent the separated material from returning into the hood 320 and thence into the electrolytic cell. Suitable filters or screens may be provided in the chamber 360 if necessary.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In an electrolytic cell for the production of aluminum, in combination, a container adapted to contain a layer of molten electrolyte and a crust of frozen electrolyte which is located above and defines a space with the molten electrolyte layer; a plurality of adjacent prebaked carbon anodes extending through the crust of frozen electrolyte and dipping into the molten electrolyte layer whereby waste gases are given off at said anodes and accumulate in the space between the molten electrolyte layer and the crust of frozen electrolyte when the cell is in operation; and an arrangement for removing waste gases from said container, said arrangement comprising at least one substantially rectangular hollow gas collecting member extending through the crust of frozen electrolyte between a pair of said anodes spaced therefrom and having an open lower end communicating with the space between the molten electrolyte layer and the crust of frozen electrolyte so that waste gases may stream into the interior of said member, said member having a substantially dome shaped bottom wall, a pair of end walls extending upwardly from said bottom wall, and a pair of side walls extending in part upwardly and in part downwardly from said bottom wall so as to define with the bottom wall a chamber communicating with the space between the molten electrolyte layer and the crust of frozen electrolyte, said side walls, said end walls and said bottom walls defining between themselves at least one compartment located above said bottom wall, a packing of heat insulating material in said compartment, and conduit means extending through said packing of heat insulating material and communicating with the chamber of said collecting member for withdrawing waste gases therefrom; and a packing of heat insulating material above the crust and filling the space between said member and the anodes adjacent thereto.

2. In an electrolytic cell for the production of aluminum, in combination, a container adapted to contain a layer of molten electrolyte and a crust of frozen electrolyte which is located above and defines a space with the molten electrolyte layer; a plurality of adjacent carbon anodes extending through the crust of frozen electrolyte and dipping in the molten electrolyte layer whereby waste gases are given off at said anodes and accumulate in the space between the molten electrolyte layer and the crust of frozen electrolyte when the cell is in operation; at least one gas collecting hood located between a pair of adjacent anodes spaced therefrom and extending through said crust, said hood having a dome-shaped bottom wall directed toward said layer of molten electrolyte and defining a chamber communicating with said space, and wall means projecting upwardly from said bottom wall and defining a compartment above the same; heat insulating means surrounding said hood above the crust and filling said compartment and the space between said hood and the anodes adjacent thereto to substantially prevent any heat dissipation from the layer of molten electrolyte beneath said open end of said hood and to substantially prevent any heat conduction between said hood and said anodes so as to maintain the molten electrolyte beneath the open end of said hood free of a crust; and conduit means communicating with the upper end of said hood for withdrawing waste gases therefrom.

3. In an electrolytic cell for the production of aluminum, in combination, a container adapted to contain a layer of molten electrolyte and a crust of frozen electrolyte which is located above and defines a space with the molten electrolyte layer; a plurality of adjacent carbon anodes extending through the crust of frozen electrolyte and dipping in the molten electrolyte layer whereby waste gases are given off at said anodes and accumulate in the space between the molten electrolyte layer and the crust of frozen electrolyte when the cell is in operation; at least one gas collecting hood located between a pair of adjacent anodes spaced therefrom and extending through said crust, said hood having a dome-shaped bottom wall directed toward said layer of molten electrolyte and defining a chamber communicating with said space, and wall means projecting upwardly from said bottom wall and defining a compartment above the same; heat insulating means surrounding said hood above the crust and filling said compartment and the space between said hood and the anodes adjacent thereto to substantially prevent any heat dissipation from the layer of molten electrolyte beneath said open end of said hood and to substantially prevent any heat conduction between said hood and said anodes so as to maintain the molten electrolyte beneath the open end of said hood free of a crust; means for feeding oxygen into said chamber for burning combustible components of said waste gas in said chamber; and conduit means communicating with the upper end of said hood for withdrawing waste gases therefrom.

4. In an electrolytic cell for the production of aluminum, in combination, a container adapted to contain a layer of molten electrolyte and a crust of frozen electrolyte which is located above and defines a space with the molten electrolyte layer; a plurality of adjacent carbon anodes extending through the crust of frozen electrolyte and dipping in the molten electrolyte layer whereby waste gases are given off at said anodes and accumulate in the space between the molten electrolyte layer and the crust of frozen electrolyte when the cell is in operation; a mechanism for lowering said anodes so that predetermined lengths of said anodes dip into the molten electrolyte layer; at least one gas collecting hood located between a pair of adjacent anodes spaced therefrom and extending through said crust, said hood having a dome-shaped bottom wall directed toward said layer of molten electrolyte and defining a chamber communicating with said space, and wall means projecting upwardly from said bottom wall and defining a compartment above the same; heat insulating means surrounding said hood above the crust and filling said compartment and the space between said hood and the anodes adjacent thereto to substantially prevent any heat dissipation from the layer of molten electrolyte beneath said open end of said hood and to substantially prevent any heat conduction between said hood and said anodes so as to maintain the molten electrolyte beneath the open end of said hood free of a crust; means for feeding oxygen into said chamber for burning combustible components of said waste gas in said chamber; conduit means communicating with the upper end of said hood for withdrawing waste gases therefrom; and means for suspending said hood on said mechanism so as to maintain said hood at a substantially constant distance from the molten electrolyte layer.

5. A combination as set forth in claim 4, wherein said mechanism comprises at least one upright member and at least one horizontal member vertically reciprocable along said upright member and supportingly connected with said anodes, said suspending means comprising pulley means mounted on said horizontal member and cable means passing about said pulley means, said cable means having a first end connected with said gas collecting hood and a second end connected with said upright member.

References Cited by the Examiner

UNITED STATES PATENTS

| | | | |
|---|---|---|---|
| 2,564,837 | 8/1951 | Ferrand | 204—247 |
| 2,593,741 | 4/1952 | Ferrand | 204—67 |
| 2,631,972 | 3/1953 | Luzzatto | 204—67 |
| 2,713,024 | 7/1955 | Mantovanello | 204—67 |
| 2,731,407 | 1/1956 | Sem et al. | 204—247 |
| 2,822,328 | 2/1958 | Walker | 204—247 |
| 2,943,914 | 7/1960 | Moser | 204—67 |
| 2,947,673 | 8/1960 | Sem et al. | 204—247 |

JOHN H. MACK, *Primary Examiner.*

JOSEPH REBOLD, ALLAN B. CURTIS, *Examiners.*

B. JOHNSON, H. S. WILLIAMS, *Assistant Examiners.*